US011191224B2

(12) United States Patent
Millar et al.

(10) Patent No.: US 11,191,224 B2
(45) Date of Patent: Dec. 7, 2021

(54) SYSTEMS AND METHODS FOR PROVIDING AIR FLOW IN A GROW POD

(71) Applicant: Grow Solutions Tech LLC, Lehi, UT (US)

(72) Inventors: Gary Bret Millar, Highland, UT (US); Mark Gerald Stott, Eagle Mountain, UT (US); Todd Garrett Tueller, American Fork, UT (US); Michael Stephen Hurst, Framington, UT (US); Alan Ray Bentley, Alpine, UT (US); Taylor John Woodbury, Provo, UT (US)

(73) Assignee: GROW SOLUTIONS TECH LLC, Vineyard, UT (US)

(*) Notice: Subject to any disclaimer, the term of this patent is extended or adjusted under 35 U.S.C. 154(b) by 273 days.

(21) Appl. No.: 15/969,969

(22) Filed: May 3, 2018

(65) Prior Publication Data

US 2018/0359959 A1   Dec. 20, 2018

Related U.S. Application Data

(60) Provisional application No. 62/519,674, filed on Jun. 14, 2017, provisional application No. 62/519,304, filed on Jun. 14, 2017.

(51) Int. Cl.
*A01G 13/08* (2006.01)
*A01G 7/02* (2006.01)
(Continued)

(52) U.S. Cl.
CPC ............... *A01G 13/08* (2013.01); *A01G 7/02* (2013.01); *A01G 9/24* (2013.01); *A01G 9/241* (2013.01);
(Continued)

(58) Field of Classification Search
CPC ........................................................ A01G 9/24
See application file for complete search history.

(56) References Cited

U.S. PATENT DOCUMENTS 4,486,977 A * 12/1984 Edgecombe ........... A01G 31/02
47/59 R
5,088,231 A *  2/1992 Kertz ..................... A01C 1/042
47/1.01 R
(Continued)

FOREIGN PATENT DOCUMENTS

EP        3257367 A1    12/2017
KR    101724380 B1 *  4/2017
(Continued)

OTHER PUBLICATIONS

KR101724380ClaimsMT; Translated Claims of KR101724380 (Year: 2017).*

(Continued)

*Primary Examiner* — Steven B McAllister
*Assistant Examiner* — Elizabeth M. May
(74) *Attorney, Agent, or Firm* — Dinsmore & Shohl LLP

(57) ABSTRACT

An air flow control system for an assembly line grow pod is provided. The air flow control system includes a shell including an enclosed area, one or more carts moving on a track within the enclosed area, an air supplier within the enclosed area, one or more outlet vents coupled to the air supplier, and a controller. The controller includes one or more processors, one or more memory modules, and machine readable instructions stored in the one or more memory modules that, when executed by the one or more processors, cause the controller to identify a plant on the one or more carts, determine an airflow rate based on an airflow (Continued)

recipe for the identified plant, and control the air supplier to output air through the one or more outlet vents at the airflow rate.

16 Claims, 10 Drawing Sheets

(51) Int. Cl.
  *A01G 31/04* (2006.01)
  *A01G 9/24* (2006.01)
(52) U.S. Cl.
  CPC ............. *A01G 9/246* (2013.01); *A01G 31/04* (2013.01); *A01G 31/042* (2013.01)

(56) References Cited

U.S. PATENT DOCUMENTS

| | | | | |
|---|---|---|---|---|
| 5,253,302 | A | * | 10/1993 | Massen ................. G06T 7/0006 382/110 |
| 7,818,894 | B2 | | 10/2010 | Noyes et al. |
| 9,288,948 | B2 | | 3/2016 | McNamara et al. |
| 2015/0027040 | A1 | * | 1/2015 | Redden ............... A01M 21/043 47/1.3 |
| 2015/0223399 | A1 | * | 8/2015 | Kokanovic ........... A01D 46/005 56/328.1 |
| 2016/0212947 | A1 | * | 7/2016 | Uchiyama ............... A01G 9/143 |
| 2016/0270304 | A1 | | 9/2016 | Higgins |
| 2017/0265408 | A1 | | 9/2017 | McGowan et al. |
| 2018/0153115 | A1 | | 6/2018 | Edke et al. |
| 2018/0168111 | A1 | * | 6/2018 | Yasukuri ................. A01G 9/24 |

FOREIGN PATENT DOCUMENTS

| | | |
|---|---|---|
| WO | 2016094305 A1 | 6/2016 |
| WO | 2016138107 A1 | 9/2016 |
| WO | 2016/164652 A1 | 10/2016 |
| WO | 2016/189477 A1 | 12/2016 |
| WO | 2017012644 A1 | 1/2017 |
| WO | 2017/024353 A1 | 2/2017 |
| WO | 2017/026390 A1 | 2/2017 |

OTHER PUBLICATIONS

KR101724380MT; Machine Translation of KR101724380 (Year: 2017).*
International Search Report and Written Opinion dated Jul. 23, 2018, pertaining to International Application No. PCT/US2018/031508, filed May 8, 2018, 15 pages.

* cited by examiner

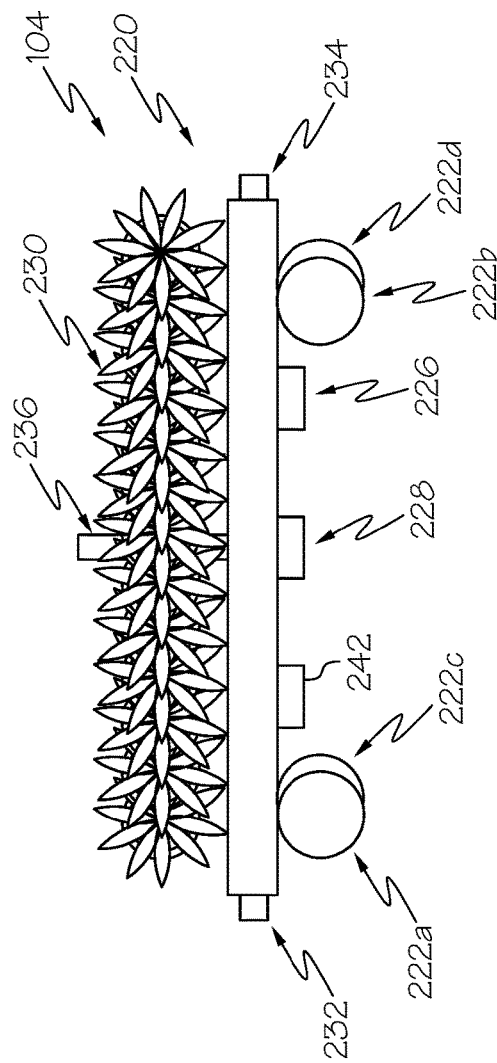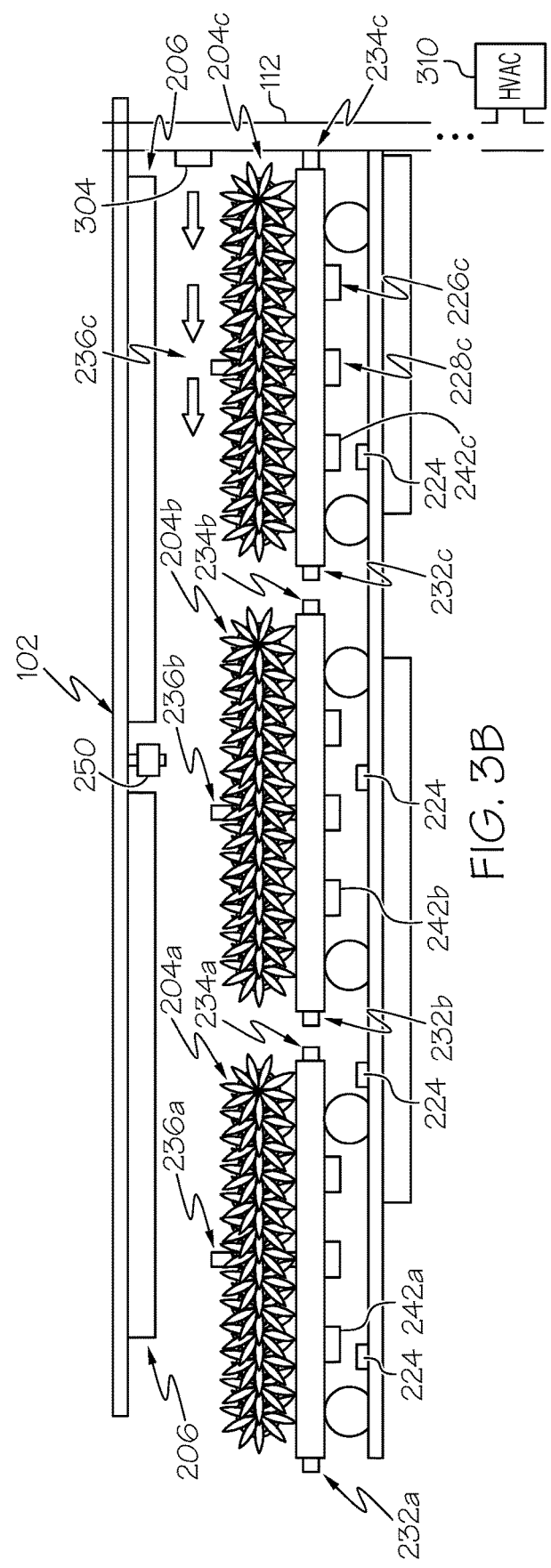

SYSTEMS AND METHODS FOR PROVIDING AIR FLOW IN A GROW POD

CROSS REFERENCE TO RELATED APPLICATIONS

This application claims the benefit of U.S. Provisional Patent Application Nos. 62/519,674 and 62/519,304 all filed on Jun. 14, 2017, the entire contents of which are herein incorporated by reference.

TECHNICAL FIELD

Embodiments described herein generally relate to systems and methods for providing airflow in a grow pod and, more specifically, to providing airflow in a grow pod using a HVAC or other system.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

For an indoor crop growth system, fungus, spores, and other undesirable contaminants may adhere to crops and damage crop production. Thus, a system for providing airflow in an indoor growing system that prevents contaminants from adhering to the crops may be needed.

SUMMARY

In one embodiment, an air flow control system for an assembly line grow pod is provided. The air flow control system includes a shell including an enclosed area, one or more carts moving on a track within the enclosed area, an air supplier within the enclosed area, one or more outlet vents coupled to the air supplier, and a controller. The controller includes one or more processors, one or more memory modules, and machine readable instructions stored in the one or more memory modules that, when executed by the one or more processors, cause the controller to: identify a plant on the one or more carts, determine an airflow rate based on an airflow recipe for the identified plant, and control the air supplier to output air through the one or more outlet vents at the airflow rate.

In another embodiment, a method for controlling airflow in an assembly line grow pod is provided. The method includes sending, by a grow pod computing device, instructions to one or more carts to move along a track within an area enclosed by a shell; identifying, by the grow pod computing device, a plant in the one or more carts; retrieving, by the grow pod computing device, an airflow recipe for the identified plant from one or more memory modules; and controlling, by the grow pod computing device, an airflow rate of air exhausted from one or more outlet vents based on the airflow recipe for the identified plant.

In another embodiment, a controller for an air supplier of an assembly line grow pod is provided. The controller includes one or more processors; one or more memory modules storing lighting recipes; and machine readable instructions stored in the one or more memory modules that, when executed by the one or more processors, cause the controller to: send instructions to one or more carts to move along a track within an area enclosed by a shell; identify a plant in the one or more carts; retrieve an airflow recipe for the identified plant from one or more memory modules; and control an airflow rate of air exhausted from one or more outlet vents connected to the air supplier based on the airflow recipe for the identified plant.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 3A depicts an industrial cart for coupling to a track, according to embodiments described herein;

FIG. 3B depicts a plurality of industrial carts in an assembly line configuration, according to embodiments described herein;

DETAILED DESCRIPTION

Embodiments disclosed herein include systems and methods for providing airflow in a grow pod. The air flow control system includes a shell including an enclosed area, one or more carts moving on a track within the enclosed area, an air supplier within the enclosed area, one or more outlet vents coupled to the air supplier, and a controller. The controller includes one or more processors, one or more memory modules, and machine readable instructions stored in the one or more memory modules that, when executed by the one or more processors, cause the controller to: identify a plant on the one or more carts, determine an airflow rate based on an airflow recipe for the identified plant, and control the air supplier to output air through the one or more outlet vents at the airflow rate. The systems and methods for providing airflow in a grow pod incorporating the same will be described in more detail, below.

Figure 1:
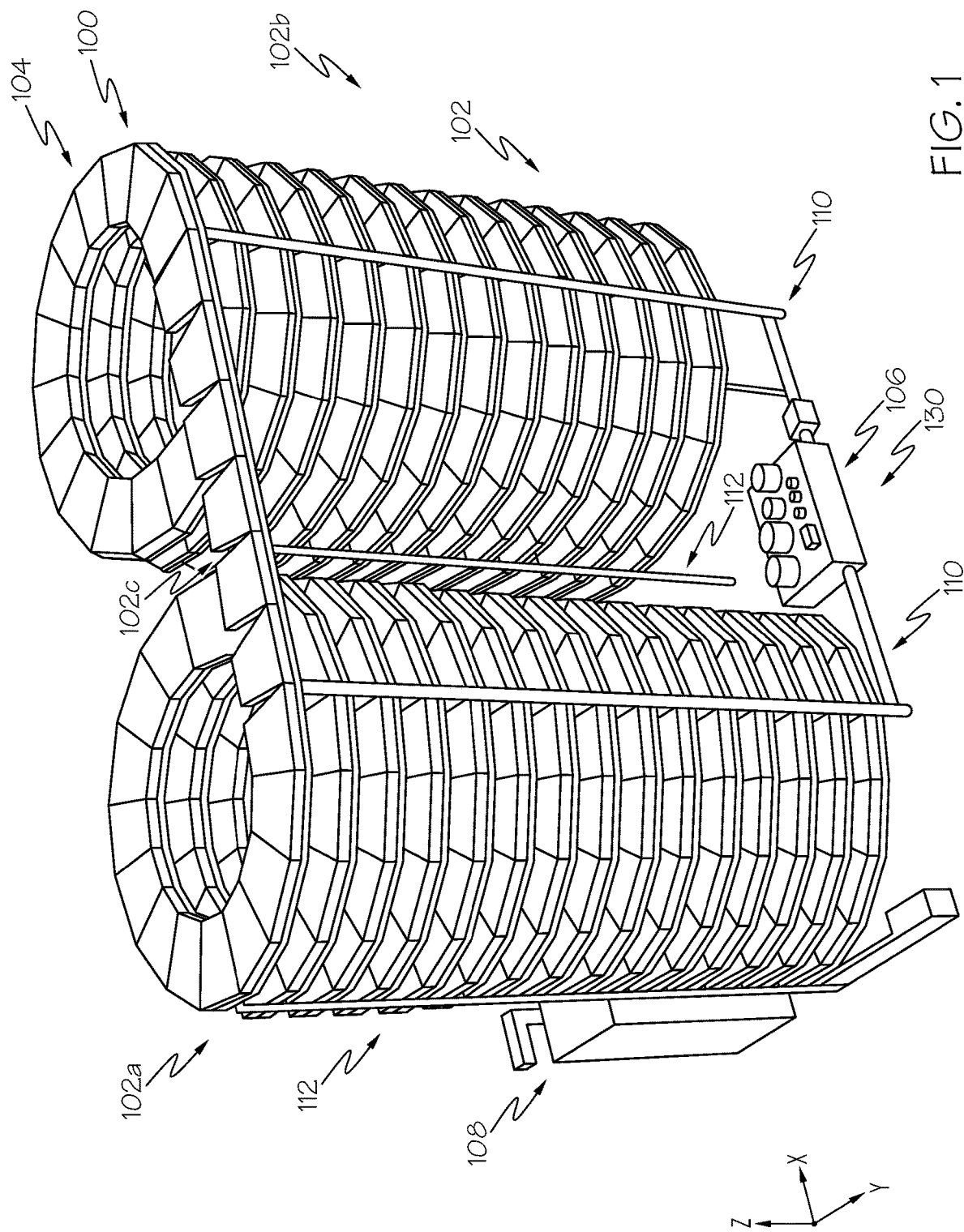
FIG. 1 depicts an assembly line grow pod that receives a plurality of industrial carts, according to embodiments described herein.

Referring now to the drawings, FIG. 1 depicts an assembly line grow pod 100 that receives a plurality of industrial carts 104, according to embodiments described herein. The assembly line grow pod 100 may be positioned on an x-y plane as shown in FIG. 1. As illustrated, the assembly line grow pod 100 may include a track 102 that holds one or more industrial carts 104. Each of the one or more industrial carts 104, as described in more detail with reference to FIGS. 3A and 3B, may include one or more wheels 222a, 222b, 222c, and 222d rotatably coupled to the industrial cart 104 and supported on the track 102, as described in more detail with reference to FIGS. 3A and 3B.

Additionally, a drive motor is coupled to the industrial cart 104. In some embodiments, the drive motor may be coupled to at least one of the one or more wheels 222a, 222b, 222c, and 222d such that the industrial cart 104 may be propelled along the track 102 in response to a signal transmitted to the drive motor. In other embodiments, the drive motor may be rotatably coupled to the track 102. For example, without limitation, the drive motor may be rotatably coupled to the track 102 through one or more gears which engage a plurality of teeth arranged along the track 102 such that the industrial cart 104 may be propelled along the track 102.

The track 102 may consist of a plurality of modular track sections. The plurality of modular track sections may include a plurality of straight modular track sections and a plurality of curved modular track sections. The track 102 may include an ascending portion 102a, a descending portion 102b, and a connection portion 102c. The ascending portion 102a and the descending portions 102b may include the plurality of curved modular track sections. The ascending portion 102a may wrap around (e.g., in a counterclockwise direction as depicted in FIG. 1) a first axis such that the industrial carts 104 ascend upward in a vertical direction. The first axis may be parallel to the z axis as shown in FIG. 1 (i.e., perpendicular to the x-y plane). The plurality of curved modular track sections of the ascending portion 102a may be tilted relative to the x-y plane (i.e., the ground) by a predetermined angle.

The descending portion 102b may be wrapped around a second axis (e.g., in a counterclockwise direction as depicted in FIG. 1) that is substantially parallel to the first axis, such that the industrial carts 104 may be returned closer to ground level. The plurality of curved modular track sections of the descending portion 102b may be tilted relative to the x-y plane (i.e., the ground) by a predetermined angle.

The connection portion 102c may include a plurality of straight modular track sections. The connection portion 102c may be relatively level with respect to the x-y plane (although this is not a requirement) and is utilized to transfer the industrial carts 104 from the ascending portion 102a to the descending portion 102b. In some embodiments, a second connection portion (not shown in FIG. 1) may be positioned near ground level that couples the descending portion 102b to the ascending portion 102a such that the industrial carts 104 may be transferred from the descending portion 102b to the ascending portion 102a. The second connection portion may include a plurality of straight modular track sections.

In some embodiments, the track 102 may include two or more parallel rails that support the industrial cart 104 via the one or more wheels 222a, 222b, 222c, and 222d rotatably coupled thereto. In some embodiments, at least two of the parallel rails of the track 102 are electrically conductive, thus capable of transmitting communication signals and/or power to and from the industrial cart 104. In yet other embodiments, a portion of the track 102 is electrically conductive and a portion of the one or more wheels 222a, 222b, 222c, and 222d are in electrical contact with the portion of the track 102 which is electrically conductive. In some embodiments, the track 102 may be segmented into more than one electrical circuit. That is, the electrically conductive portion of the track 102 may be segmented with a non-conductive section such that a first electrically conductive portion of the track 102 is electrically isolated from a second electrically conductive portion of the track 102 which is adjacent to the first electrically conductive portion of the track 102.

The communication signals and power may further be received and/or transmitted via the one or more wheels 222a, 222b, 222c, and 222d of the industrial cart 104 and to and from various components of industrial cart 104, as described in more detail herein. Various components of the industrial cart 104, as described in more detail herein, may include the drive motor, the control device, and one or more sensors.

In some embodiments, the communication signals and power signals may include an encoded address specific to an industrial cart 104 and each industrial cart 104 may include a unique address such that multiple communication signals and power may be transmitted over the same track 102 and received and/or executed by their intended recipient. For example, the assembly line grow pod 100 system may implement a digital command control system (DCC). DDC systems encode a digital packet having a command and an address of an intended recipient, for example, in the form of a pulse width modulated signal that is transmitted along with power to the track 102.

In such a system, each industrial cart 104 includes a decoder, which may be the control device coupled to the industrial cart 104, designated with a unique address. When the decoder receives a digital packet corresponding to its unique address, the decoder executes the embedded command. In some embodiments, the industrial cart 104 may also include an encoder, which may be the control device coupled to the industrial cart 104, for generating and transmitting communications signals from the industrial cart 104, thereby enabling the industrial cart 104 to communicate with other industrial carts 104 positioned along the track 102 and/or other systems or computing devices communicatively coupled with the track 102.

While the implementation of a DCC system is disclosed herein as an example of providing communication signals along with power to a designated recipient along a common interface (e.g., the track 102) any system and method capable of transmitting communication signals along with power to and from a specified recipient may be implemented. For example, in some embodiments, digital data may be transmitted over AC circuits by utilizing a zero-cross, step, and/or other communication protocol.

Additionally, while not explicitly illustrated in FIG. 1, the assembly line grow pod 100 may also include a harvesting component, a tray washing component, and other systems and components coupled to and/or in-line with the track 102. In some embodiments, the assembly line grow pod 100 may include a plurality of lighting devices, such as light emitting diodes (LEDs). The lighting devices may be disposed on the track 102 opposite the industrial carts 104, such that the lighting devices direct light waves to the industrial carts 104 on the portion the track 102 directly below. In some embodiments, the lighting devices are configured to create a plurality of different colors and/or wavelengths of light, depending on the application, the type of plant being grown, and/or other factors. Each of the plurality of lighting devices may include a unique address such that a master controller 106 may communicate with each of the plurality of lighting devices. While in some embodiments, LEDs are utilized for this purpose, this is not a requirement. Any lighting device that produces low heat and provides the desired functionality may be utilized.

Also depicted in FIG. 1 is a master controller 106. The master controller 106 may include a computing device 130, a nutrient dosing component, a water distribution component, and/or other hardware for controlling various components of the assembly line grow pod 100. In some embodiments, the master controller 106 and/or the computing device 130 are communicatively coupled to a network 550 (as depicted and further described with reference to FIG. 4). The master controller 106 may control operations of the HVAC system 310 shown in FIG. 4, which will be described in detail below.

Coupled to the master controller 106 is a seeder component 108. The seeder component 108 may be configured to seed one or more industrial carts 104 as the industrial carts 104 pass the seeder in the assembly line. Depending on the particular embodiment, each industrial cart 104 may include a single section tray for receiving a plurality of seeds. Some embodiments may include a multiple section tray for receiving individual seeds in each section (or cell). In the embodiments with a single section tray, the seeder component 108 may detect presence of the respective industrial cart 104 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray is utilized with one or more of the industrial carts 104, the seeder component 108 may be configured to individually insert seeds into one or more of the sections of the tray. Again, the seeds may be distributed on the tray (or into individual cells) according to a desired number of seeds, a desired area the seeds should cover, a desired depth of seeds, etc. In some embodiments, the seeder component 108 may communicate the identification of the seeds being distributed to the master controller 106.

The watering component may be coupled to one or more water lines 110, which distribute water and/or nutrients to one or more trays at predetermined areas of the assembly line grow pod 100. In some embodiments, seeds may be sprayed to reduce buoyancy and then flooded. Additionally, water usage and consumption may be monitored, such that at subsequent watering stations, this data may be utilized to determine an amount of water to apply to a seed at that time.

Also depicted in FIG. 1 are airflow lines 112. Specifically, the master controller 106 may include and/or be coupled to one or more components that delivers airflow for temperature control, humidity control, pressure control, carbon dioxide control, oxygen control, nitrogen control, etc. Accordingly, the airflow lines 112 may distribute the airflow at predetermined areas in the assembly line grow pod 100. For example, the airflow lines 112 may extend to each story of the ascending portion 102*a* and the descending portion 102*b*.

It should be understood that while some embodiments of the track may be configured for use with a grow pod, such as that depicted in FIG. 1, this is merely an example. The track and track communications are not so limited and can be utilized for any track system where communication is desired.

Figure 2:
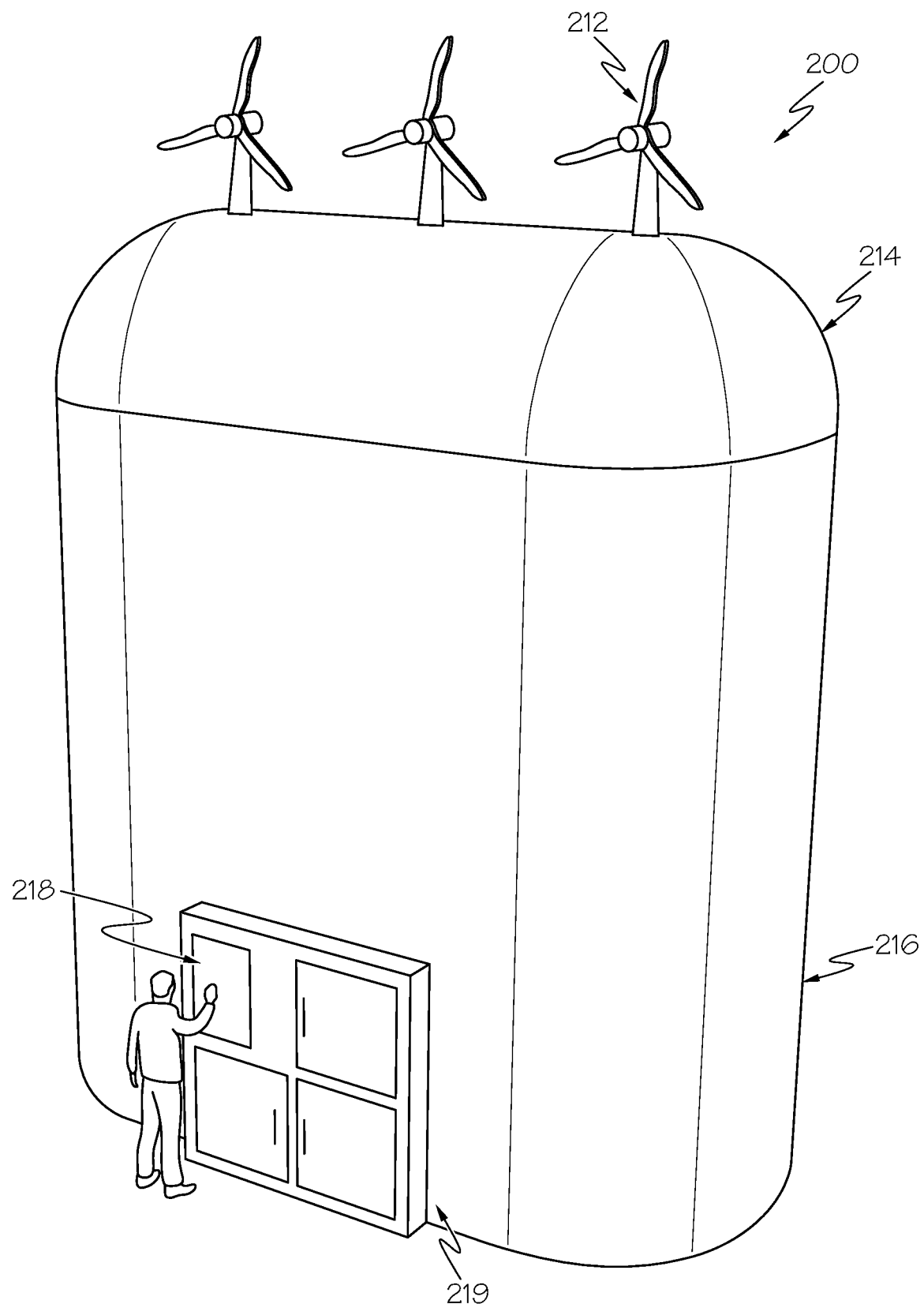
FIG. 2 depicts an external shell of an assembly line grow pod according to embodiments described herein.

Referring now to FIG. 2 depicts an external shell 200 of the assembly line grow pod 100 of FIG. 1 according to embodiments described herein. As illustrated, the external shell 200 contains the assembly line grow pod 100 inside, maintains an environment inside, and prevents the external environment from entering. The external shell 200 includes a roof portion 214 and a side wall portion 216. In some embodiments, the roof portion 214 may include photoelectric cells that may generate electric power by receiving sunlight. In some embodiments, the roof portion 214 may include one or more wind turbines 212 that may generate electric power using wind power. Coupled to the external shell 200 is a control panel 219 with a user input/output device 218, such as a touch screen, monitor, keyboard, mouse, etc.

The air inside the external shell 200 may be maintained independent of the air outside of the external shell 200. For example, the temperature of the air inside the external shell 200 may be different from the temperature of the air outside the external shell 200. The external shell 200 may be made of insulating material that prevents heat from transferring between outside and inside of the external shell 200. Airflow outside the external shell 200 does not affect the airflow inside the external shell 200. For example, the wind speed of the air inside the external shell 200 may be different from the wind speed of the air outside the external shell 200. The air inside the external shell 200 may include nitrogen, oxygen, carbon dioxide, and other gases, the proportions of which are similar to the proportions of the air outside the external shell 200. In some embodiments, the proportions of nitrogen, oxygen, carbon dioxide, and other gases inside the external shell 200 may be different from the proportions of the air outside the external shell 200. The dimensions of the air inside the external shell 200 may be less than, 10,000 cubic feet, for example, about 4,000 cubic feet.

FIG. 3A depicts an industrial cart 104 that may be utilized for the assembly line grow pod 100, according to embodiments described herein. As illustrated, the industrial cart 104 includes a tray section 220 and one or more wheels 222*a*, 222*b*, 222*c*, and 222*d*. The one or more wheels 222*a*, 222*b*, 222*c*, and 222*d* may be configured to rotatably couple with the track 102, as well as receive power, from the track 102. The track 102 may additionally be configured to facilitate communication with the industrial cart 104 through the one or more wheels 222*a*, 222*b*, 222*c*, and 222*d*.

In some embodiments, one or more components may be coupled to the tray section 220. For example, a drive motor 226, a cart computing device 228, and/or a payload 230 may be coupled to the tray section 220 of the industrial cart 104. The tray section 220 may additionally include a payload 230. Depending on the particular embodiment, the payload 230 may be configured as plants (such as in an assembly line grow pod 100); however this is not a requirement, as any payload 230 may be utilized.

The drive motor 226 may be configured as an electric motor and/or any device capable of propelling the industrial cart 104 along the track 102. For example, without limitation, the drive motor 226 may be configured as a stepper motor, an alternating current (AC) or direct current (DC) brushless motor, a DC brushed motor, or the like. In some embodiments, the drive motor 226 may comprise electronic circuitry which may adjust the operation of the drive motor 226 in response to a communication signal (e.g., a command or control signal) transmitted to and received by the drive motor 226. The drive motor 226 may be coupled to the tray section 220 of the industrial cart 104 or directly coupled to the industrial cart 104.

In some embodiments, the cart computing device 228 may control the drive motor 226 in response to a leading sensor 232, a trailing sensor 234, and/or an orthogonal sensor 242 included on the industrial cart 104. Each of the leading sensor 232, the trailing sensor 234, and the orthogonal sensor 242 may comprise an infrared sensor, visual light sensor, an ultrasonic sensor, a pressure sensor, a proximity sensor, a motion sensor, a contact sensor, an image sensor, an inductive sensor (e.g., a magnetometer) or other type of sensor. The cart 104 may include an airflow sensor 236.

Figure 4:
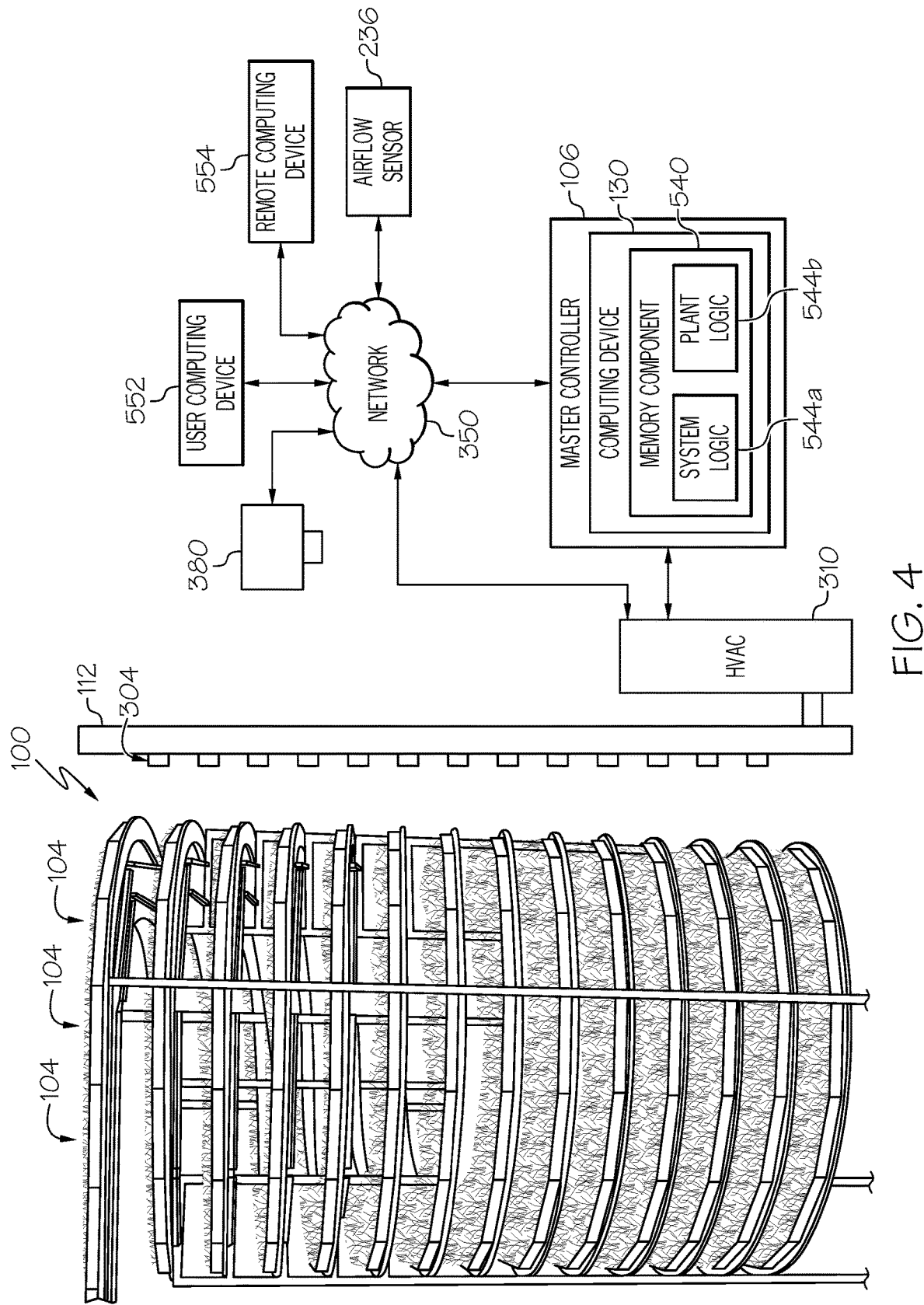
FIG. 4 depicts an assembly grow pod including a HVAC system configured to control airflow for the assembly line grow pod, according to embodiments described herein.

In some embodiments, the leading sensor 232, the trailing sensor 234, airflow sensor 236, and/or the orthogonal sensor 242 may be communicatively coupled to the master controller 106 (FIG. 1). In some embodiments, for example, the leading sensor 232, the trailing sensor 234, the airflow sensor 236, and the orthogonal sensor 242 may generate one or more signals that may be transmitted via the one or more wheels 222a, 222b, 222c, and 222d and the track 102 (FIG. 1). In some embodiments, the track 102 and/or the industrial cart 104 may be communicatively coupled to a network 550 (FIG. 4). Therefore, the one or more signals may be transmitted to the master controller 106 via the network 550 over network interface hardware 634 (FIG. 10) or the track 102 and in response, the master controller 106 may return a control signal to the drive motor 226 for controlling the operation of one or more drive motors 226 of one or more industrial carts 104 positioned on the track 102. In some embodiments, the master controller 106 may control the operation of the HVAC system 310 to adjust airflow from the vent 304 shown in FIG. 3B. For example, the master controller 106 receives information on the airflow detected by the airflow sensor 236 and controls the operation of the HVAC system 310 to adjust the speed of airflow from the vent 304.

While FIG. 3A depicts the airflow sensor 236 positioned generally above the industrial cart 104, as previously stated, the airflow sensor 236 may be coupled with the industrial cart 104 in any location which allows the airflow sensor 236 to detect the airflow above and/or below the industrial cart 104.

Figure 10:
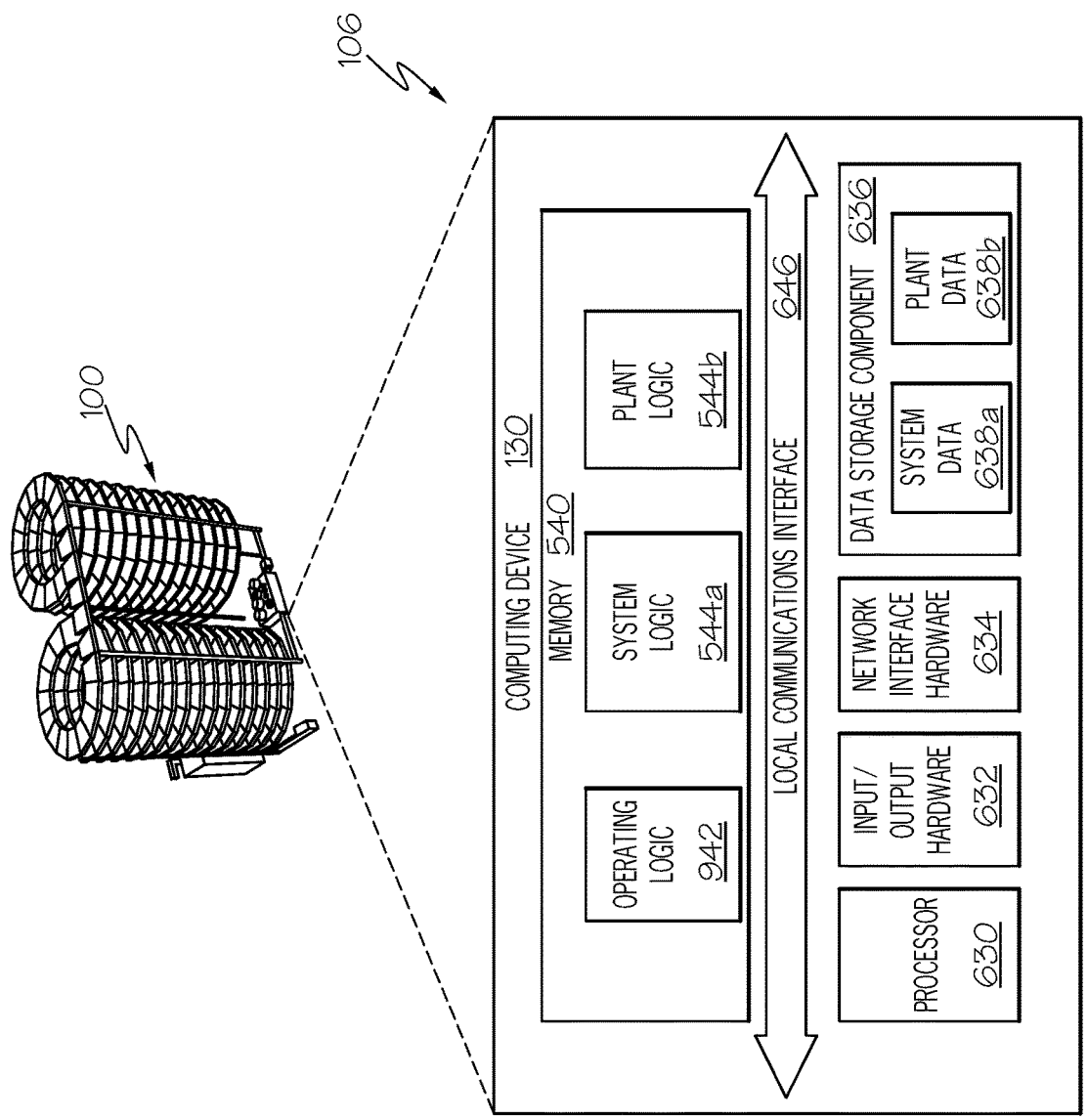
FIG. 10 depicts a computing device for an assembly line grow pod, according to embodiments described herein.

In some embodiments, location markers 224 may be placed along the track 102 or the supporting structures to the track 102 at pre-defined intervals. The orthogonal sensor 242, for example, without limitation, comprises a photo-eye type sensor and may be coupled to the industrial cart 104 such that the photo-eye type sensor may view the location markers 224 positioned along the track 102 below the industrial cart 104. As such, the cart computing device 228 and/or master controller 106 may receive one or more signals generated from the photo-eye in response to detecting a location marker 224 as the industrial cart travels along the track 102. The cart computing device 228 and/or master controller 106, from the one or more signals, may determine the speed of the industrial cart 104. The speed information may be transmitted to the master controller 106 via the network 550 over network interface hardware 634 (FIG. 10).

FIG. 3B depicts a partial view of the assembly line grow pod 100 shown in FIG. 1, according to embodiments described herein. As illustrated, the industrial cart 204b is depicted as being similarly configured as the industrial cart 104 from FIG. 3A. However, in the embodiment of FIG. 3B, the industrial cart 204b is disposed on a track 102. As discussed above, at least a portion of the one or more wheels 222a, 222b, 222c, and 222d (or other portion of the industrial cart 204b) may couple with the track 102 to receive communication signals and/or power.

Also depicted in FIG. 3B are a leading cart 204a and a trailing cart 204c. As the industrial carts 204a, 204b, and 204c are moving along the track 102, the leading sensor 232b and the trailing sensor 234b may detect the trailing cart 204c and the leading cart 204a, respectively, and maintain a predetermined distance from the trailing cart 204c and the leading cart 204a.

As shown in FIG. 1, the airflow line 112 extends on every floor of the assembly line grow pod 100. The airflow line 112 may include a plurality of vents 304 each of which is configured to output airflow on each story of the assembly line grow pod 100. FIG. 3B depicts a partial view of the airflow line 112 including the vent 304. The vent 304 shown in FIG. 3B is configured to output air as indicated by arrows. The airflow line 112 is connected to the HVAC system 310 which controls the output of the airflow from the vent 304. The assembly line grow pod 100 and a HVAC system 310 are placed inside the external shell 200 of FIG. 2. The HVAC system 310 operates inside the external shell 200 and may be configured to control temperature, humidity, molecules, flow of the air inside the external shell 200. The dimensions of the air inside the external shell 200 may be less than, 10,000 cubic feet, for example, about 4,000 cubic feet. The HVAC system 310 may be optimized for the dimension of the air inside the external shell 200.

The airflow output from the vent 304 proceeds in a direction opposite to the moving direction of the industrial carts 204a, 204b, and 204c. The airflow passes through the payload 230 on the industrial carts 204a, 204b, and 204c to prevent spores and other contaminants from adhering to the payload 230. The airflow sensors 236a, 236b, and 236c may detect airflow on each of the industrial carts 204a, 204b, and 204c, and transmit airflow information to the master controller 106. The master controller 106 controls the operation of the HVAC system 310 to increase, decrease, or maintain the airflow output from the vent 304 based on the airflow information received from the airflow sensors 236a, 236b, and 236c. In embodiments, the master controller 106 may identify payload 230 on the carts 204a, 204b, and 204c, and control the operation of the HVAC system 310 based on the airflow recipe for the identified payload.

Still referring to FIG. 3B, a location marker 224 is coupled to the track 102. Although the location marker 224 is depicted as being coupled to the underside of the track 102 above the industrial carts 204a, 204b, and 204c, the location marker 224 may be positioned in any location capable of indicating a unique section of the track 102 to the industrial carts 204a, 204b, and 204c.

The location marker 224 may include a communication portal and may be configured to communicate with the any of the orthogonal sensors 242a, 242b, and 242c. The location marker 224 may comprise an infrared emitter, a bar code, a QR code or other marker capable of indicating a unique location. That is, the location marker 224 may be an active device or a passive device for indicating a location on along the track 102. In some embodiments, the location marker 224 may emit infrared light or visual light at a unique frequency that may be identifiable by the orthogonal sensors 242a, 242b, and 242c.

In some embodiments, the location marker 224 may require line of sight and thus will communicate with the one or more industrial carts 204a, 204b, and 204c that are within that range. Regardless, the respective industrial cart 204a, 204b, 204c may communicate data detected from cart sensors, including the leading sensor 232, the trailing sensor 234, the airflow sensor 236 and/or other sensors. Additionally, the master controller 106 may provide data and/or commands for use by the industrial carts 204a, 204b, and 204c via the location marker 224. In some embodiments, the one or more industrial carts 204a, 204b, and 204c may communicate their current location to the master controller 106 by reading the location markers 224.

In operation, for example, the location marker 224 may designate a unique location along the track 102. As the industrial cart 204b passes in proximity to the location marker 224, the orthogonal sensor 242b may register the unique location (e.g., detect the location marker 224, which is a detected event). By determining the location of the industrial cart 204b along the track 102 from the detected location marker 224 and determining the unique location which the location marker 224 represents, the position of the industrial cart 204b with respect to other industrial carts 204a, 204c may be determined and other functional attributes of the industrial cart 204b may also be determined. For example, the speed of the industrial cart 204b may be determined based on the time that elapses between two unique locations along the track 102 where the distance between the locations is known. Additionally, through communication with the master controller 106 or with the other industrial carts, distances between the industrial carts 204a, 204b, and 204c may be determined and in response the drive motors 226 may be adjusted as necessary.

In some embodiments, the master controller 106 receives the speed information about the industrial carts 204a, 204b, and 204c, and controls the operation of the HVAC system 310 to adjust the speed of air flow form the vent 304. For example, if the industrial carts 204a, 204b, and 204c stop moving on the track 102, the master controller 106 may instruct the HVAC system 310 to increase the speed of the airflow output from the vent 304 such that the airflow output from the vent 304 prevents spores and other contaminants from adhering to the payload 230. If the industrial carts 204a, 204b, and 204b move at a speed that is greater than a predetermined speed, the master controller 106 may instruct the HVAC system 310 to decrease the speed of the airflow output from the vent 304 or stop the airflow from the vent 304.

Still referring to FIG. 3B, one or more imaging devices 250 may be placed at the bottom of the track 102. The one or more imaging device 250 may be placed throughout the track 102 including the ascending portion 102a, the descending portion 102b, and the connection portion 102c. The one or more imaging devices 250 may be any device having an array of sensing components (e.g., pixels) capable of detecting radiation in an ultraviolet wavelength band, a visible light wavelength band, or an infrared wavelength band. The one or more imaging devices 250 may have any resolution. The one or more imaging devices 250 are communicatively coupled to the master controller 106. For example, the one or more imaging devices 250 may be hardwired to the master controller 106 and/or may wirelessly communicate with the master controller 106. The one or more imaging devices 250 may capture an image of the payload 230 and transmit the captured image to the master controller 106. The master controller 106 may analyze the captured image to determine the status of the payload 230.

For example, the master controller 106 may determine the stage of growth for the payload 230 based on the analysis of the captured image, for example, a level of chlorophyll production, fruit output, foliage, etc. The master controller 106 may identify the size and color of the payload 230 by analyzing the captured image and determine the stage of growth for the payload 230 based on the size and color of the payload 230.

In some embodiments, the master controller 106 may receive images of payload 230 from the imaging device 250 and process the images to determine whether spores or other contaminants are deposited to the payload 230. If it is determined that spores or other contaminants are deposited to the payload 230 of a certain industrial cart (e.g., the industrial cart 204b), then the master controller 106 may instruct the HVAC system 310 to increase the airflow from the vent 304 when the industrial cart 204b is proximate to the vent 304, such that the spores or other contaminants may be blown away. In some embodiments, the master controller 106 may receive images of payload 230 from the imaging device 250 and process the images to determine the type of spores or contaminants. The master controller 106 may instruct the HVAC system 310 to adjust a power and/or direction of the airflow from the vent 304 based on the identified type of spores or contaminants.

FIG. 4 depicts air flow control system, according to one or more embodiments shown and described herein. The assembly line grow pod 100 and a HVAC system 310 are placed inside the external shell 200 of FIG. 2. The HVAC system 310 operates inside the external shell 200 and may be configured to control temperature, humidity, molecules, flow of the air inside the external shell 200. The dimensions of the air inside the external shell 200 may be less than, 10,000 cubic feet, for example, about 4,000 cubic feet. The HVAC system 310 may be optimized for the dimension of the air inside the external shell 200.

As illustrated in FIG. 4, the assembly line grow pod 100 may include the master controller 106, which may include the computing device 130. The computing device 130 may include a memory component 540, which stores systems logic 544a and plant logic 544b. As described in more detail below, the systems logic 544a may monitor and control operations of one or more of the components of the assembly line grow pod 100. For example, the systems logic 544a may monitor and control operations of the HVAC system 310. The plant logic 544b may be configured to determine and/or receive a recipe for plant growth and may facilitate implementation of the recipe via the systems logic 544a. For example, the recipe may include airflow recipes for plants, and the systems logic 544a operates the HVAC system 310 based on the airflow recipes.

The assembly line grow pod 100 monitors the growth of plants carried in the carts 104, and the recipe for plant growth may be updated based on the growth of plants. For example, the airflow recipes for plants may be updated by monitoring the growth of those plants carried in the carts 104.

Additionally, the assembly line grow pod 100 is coupled to a network 550. The network 550 may include the internet or other wide area network, a local network, such as a local area network, a near field network, such as Bluetooth or a near field communication (NFC) network. The network 550 is also coupled to a user computing device 552 and/or a remote computing device 554. The user computing device 552 may include a personal computer, laptop, mobile device, tablet, server, etc. and may be utilized as an interface with a user. As an example, a user may send a recipe to the computing device 130 for implementation by the assembly line grow pod 100. Another example may include the assembly line grow pod 100 sending notifications to a user of the user computing device 552.

Similarly, the remote computing device 554 may include a server, personal computer, tablet, mobile device, etc. and may be utilized for machine to machine communications. As an example, if the assembly line grow pod 100 determines a type of seed being used (and/or other information, such as ambient conditions), the computing device 130 may communicate with the remote computing device 554 to retrieve a previously stored recipe for those conditions. As such, some embodiments may utilize an application program interface (API) to facilitate this or other computer-to-computer communications.

The HVAC system 310 may be connected to a plurality of airflow lines 112. Each of the airflow lines 112 may include a plurality of vents 304. Each of the plurality of vents 304 is configured to output air. In embodiments, the plurality of vents 304 may correspond to the carts 104 on each floor of the assembly line grow pod 100, as shown in FIG. 4. In some embodiments, the plurality of vents 304 may be placed at different locations. For example, the plurality of vents 304 may be placed at the top of the assembly line grow pod 100. As another example, the plurality of vents 304 may be placed at the bottom of the assembly line grow pod 100, and output air through a central axis of the ascending portion 102a or the descending portion 102b.

The HVAC system 310 may output air through the plurality of vents 304 according to an airflow recipe for plants. An airflow speed may be detected by one or more airflow sensors 236. The one or more airflow sensors 236 may be located on each of the industrial carts 104, or at any other locations within the external shell 200. In some embodiments, one or more airflow sensors may be located within the airflow lines 112. The one or more airflow sensors 236 may be wired to or wirelessly coupled to the master controller 106. For example, the one or more airflow sensors 236 may wirelessly transmit the detected airflow to the master controller 106 via the network 350. The master controller 106 compares the current airflow speed with the airflow recipe for plants. For example, if the current airflow is 9 milliliters per second, and the airflow recipe for plants is 11 milliliters per second, the master controller 106 instructs the HVAC system 310 to increase the airflow to be 11 milliliters per second.

The HVAC system 310 may output air through the plurality of vents 304 or input air through vents 304 to generate airflow within the external shell 200. In embodiments, the HVAC system 310 may output air through the plurality of vents 304 to create a predetermined airflow to the plants. The airflow recipes for plants may be stored in the plant logic 544b of the memory component 540 (and/or in the plant data 638b from FIG. 10) and the master controller 106 may retrieve the airflow recipes from the plant logic 544b. For example, the plant logic 544b may include airflow recipes for plants as shown in Table 1 below.

TABLE 1

| | Airflow rate |
|---|---|
| Plant A | 13 milliliters per second |
| Plant B | 25 milliliters per second |
| Plant C | 9 milliliters per second |
| Plant D | 5 milliliters per second |
| Plant E | 11 milliliters per second |

The master controller 106 may identify the plants in the carts 204. For example, the master controller 106 may communicate with the carts 204 and receive information about the plants in the carts 204. As another example, the information about the plants in the carts 204 may be pre-stored in the master controller 106 when the seeder component 108 seeds plant A in the carts 204.

The master controller 106 may control the HVAC system 310 based on the identified plants. For example, if the current plants in the assembly line grow pod 100 are identified as plant B, then the master controller 106 controls the HVAC system 310 to output airflow at a rate of 25 milliliters per second toward the plants B based on the airflow recipe for plant B. In embodiments, the airflow recipes for plants may be updated based on information on harvested plants. For example, if the harvested plants A are generally less sturdy than ideal plants A, the airflow rate for plants A may be increased to further strengthen plants A that are to be harvested. In some embodiments, the plurality of vents 304 may be configured to output air at different speeds based on the plants proximate to the plurality of vents 304. Each of the vents 304 may include a valve that controls the speed of the air output therefrom. For example, one vent 304 may output air at the rate of 9 millimeters per second when plants C are proximate to the vent 304 while another vent 304 may output air at the rate of 11 millimeters per second when plants E are proximate to the another vent 304.

In some embodiment, the master controller 106 may receive an airflow rate from the user computing device 552. For example, an operator inputs an airflow rate for plants currently growing in the assembly line grow pod 100, and the master controller 106 receives the airflow rate and operates the HVAC system 310 based on the received airflow rate.

The airflow provided by the HVAC system 310 serves various purposes. For example, the airflow strengthens the plants as they grow. The appropriate airflow rate for strengthening each of different plants may be stored as an airflow recipe for each of the plants, for example, as Table 1 above, and the master controller 106 adjusts the airflow rate output from the plurality of vents 304 based on the airflow recipe. As another example, the airflow may prevent spores or other contaminants from adhering to the plants on the industrial carts 104. As another example, the airflow may provide additional carbon dioxide and/or other molecules to the plants. The airflow may provide circulate the air inside the external shell 200 such that gases including carbon dioxide are adequately provided to the plants. As another example, the airflow may dry or dampen the plants depending on the humidity of the air. An airflow containing low humidity may dry plants and an airflow containing high humidity dampens the plants.

Figure 5:
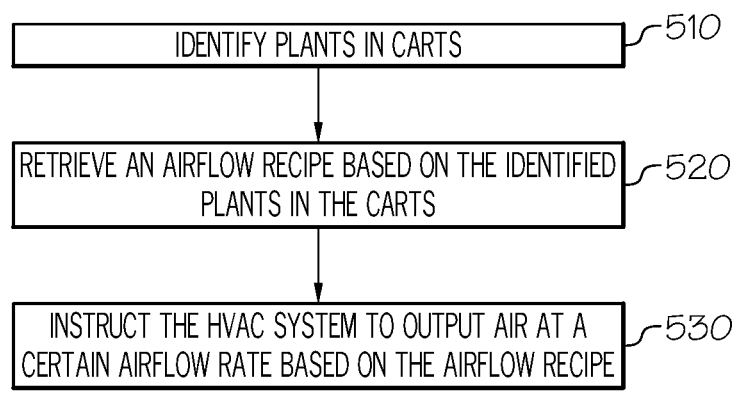
FIG. 5 depicts a flowchart for controlling airflow for the assembly line grow pod, according to embodiments described herein.

FIG. 5 depicts a flowchart for providing airflow in the assembly line grow pod, according to one or more embodiments described herein. As illustrated in block 510, the master controller 106 identifies plants being carried in carts 204. For example, an operator inputs the type of seeds for plants that need to be grown in the carts through the user computing device 552, and the master controller 106 receives the type of seeds for plants from the user computing device 852. As another example, the master controller 106 may obtain identification of plants from the seeder component 108 that seeds the plants in the carts. As another example, the master controller 106 may receive images of plants captured by the one or more imaging devices 250 and process the images to identify the plants.

In block 520, the master controller 106 retrieves an airflow recipe based on the identified plants in the carts. In embodiments, the airflow recipe may be pre-stored in the plant logic 544b of the master controller 106. In some embodiments, the airflow recipe may be entered by an operator through the user computing device 552, and the master controller 106 receives the airflow recipe from the user computing device 552. In some embodiments, the airflow recipe may be stored in the remote computing device 554, and the master controller 106 retrieves the airflow recipe from the remote computing device 554. In block 530, the master controller 106 instructs the HVAC system 310 to output air at a certain airflow rate based on the airflow recipe. In some embodiments, the master controller 106 instructs the HVAC system 402 to output air at a certain direction based on the airflow recipe.

Figure 6:
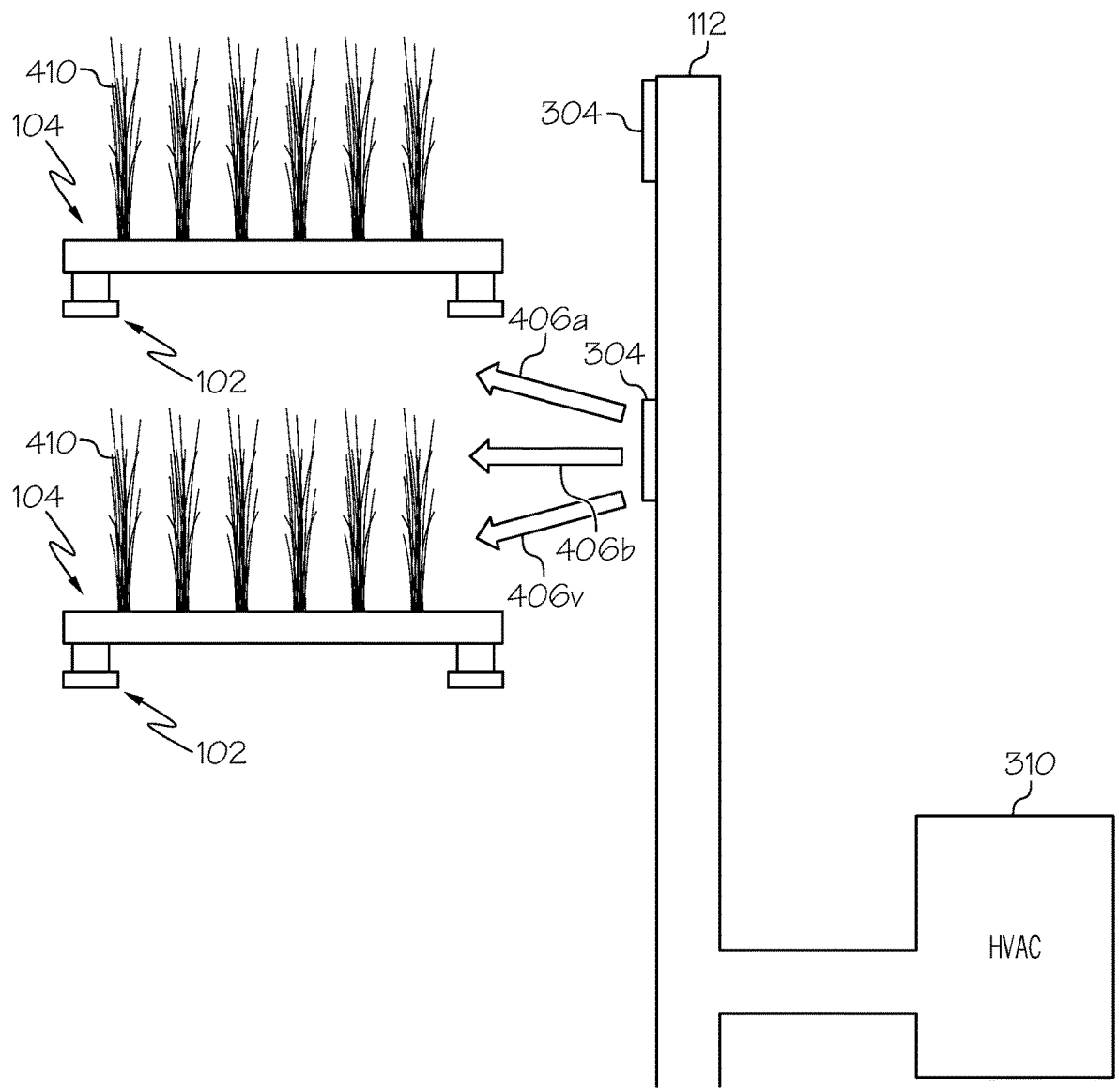
FIG. 6 depicts adjusting airflow direction of the HVAC system, according to one or more embodiments described herein.

FIG. 6 depicts adjusting airflow direction of the HVAC system 310, according to one or more embodiments described herein. The vents 304 may output airflow in various directions. For example, as shown in FIG. 6, the vents 304 may output airflow in a first direction 406a that is directed to the top of the plants, in a second direction 406b that is directed to the middle of the plants, or in a third direction 406c that is directed to the bottom of the plants. The direction of the airflow for each of the plurality of vents 304 may be controlled by the master controller 106. In embodiments, a motor or other moving mechanism may be coupled to the vents 302, and the master controller 106 may control the motor or other moving mechanism to change the angle of the vents 302. For example, the vents 302 are pivotally coupled to the airflow line 112, and the motor or other moving mechanism may change the angle of the vents 302. In some embodiments, a motor or other moving mechanism change the height of the vents 302. The direction of the airflow may be determined based on the identification of plants on the carts. For example, the plurality of vents 304 output air in the first direction 406a if plants A on the carts while the plurality of vents 304 output air in the second direction 406b if plants B on the carts. In some embodiments, the master controller 106 may control the plurality of vents 304 to continuously change the direction of air. For example, the master controller 106 may instruct the plurality of vents 404 to output air in the first direction 406a for 10 minutes, and then, in the second direction 406b for 10 minutes, and then, in the third direction 406c for 10 minutes.

Figure 7:
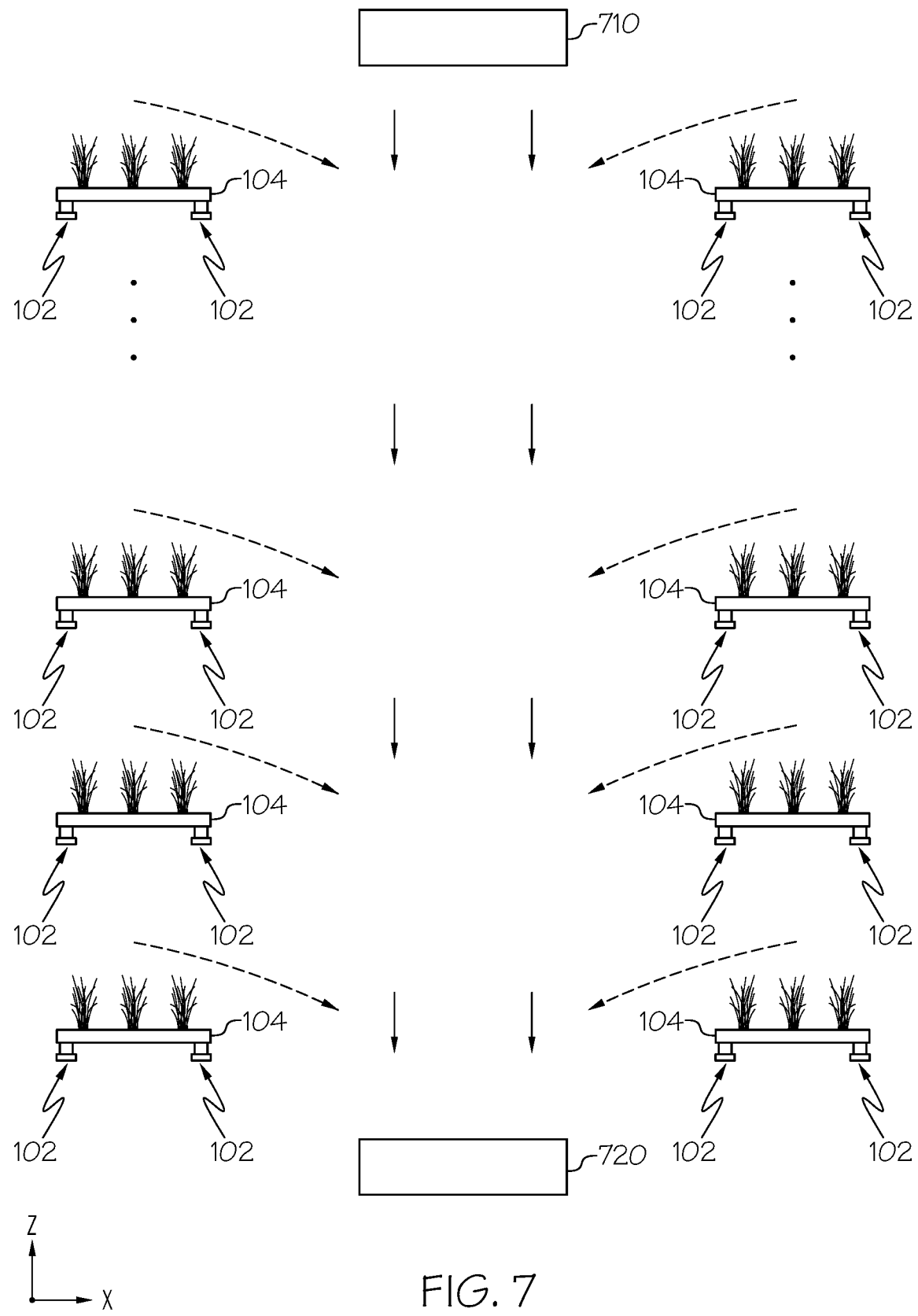
FIG. 7 depicts generating airflow in an assembly line grow pod, according to one or more embodiments shown and described herein.

FIG. 7 depicts a cross-sectional view of the ascending portion 102a or the descending portion 102b in FIG. 1, according to one or more embodiments shown and described herein. In embodiments, an air blower 710 may be located at the top of the ascending portion 102a or the descending portion 102b and output air in −z direction. An air intaker 720 may be located at the bottom of the ascending portion 102a or the descending portion 102b, such that the air output from the air blower 710 flows into the air intaker 720 as shown by arrows in FIG. 7. The air blower 710 and the air intaker 720 are connected to the HVAC system 310 such that the HVAC system 310 controls the airflow by the air blower 710 and the air intaker 720. On each story of the ascending portion 102a or the descending portion 102b, airflow is created in a direction toward the center of the ascending portion 102a or the descending portion 102b indicated as broken arrows in FIG. 7.

In embodiments, the vents 304 shown in FIG. 3 may be located on each story of the ascending portion 102a or the descending portion 102b and generate airflow in the direction toward the center of the ascending portion 102a or the descending portion 102b. In some embodiments, the assembly line grow pod 100 does not include the plurality of vents 304, and the airflow created by the air blower 710 and the air intaker 720 induces airflow in the direction toward the center of the ascending portion 102a or the descending portion 102b. While FIG. 7 depicts the air blower 710 located at the top and the air intaker 720 located at the bottom of the ascending portion 102a or the descending portion 102b, the air blower 710 may be located at the bottom and the air intaker 720 may be located at the top such that the airflow is generated in +z direction.

Figure 8:
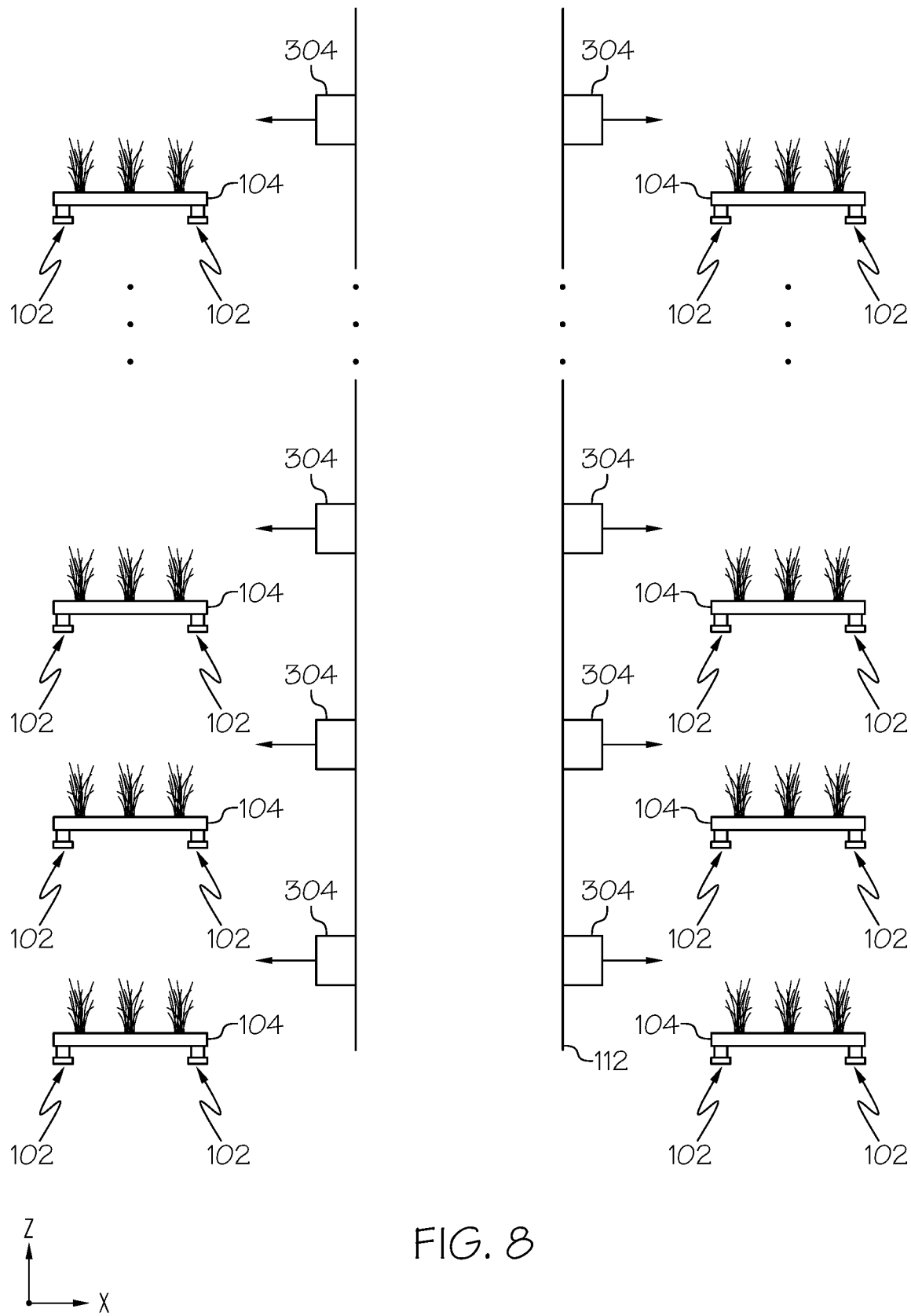
FIG. 8 depicts generating airflow in an assembly line grow pod, according to one or more embodiments shown and described herein.

FIG. 8 depicts a cross-sectional view of the ascending portion 102a or the descending portion 102b in FIG. 1, according to one or more embodiments shown and described herein. In embodiments, the airflow line 112 extends along the axis of the ascending portion 102a or the descending portion 102b as shown in FIG. 8. The airflow line 112 is connected to the HVAC system 310 (shown in FIG. 4). The airflow line 112 includes a plurality of vents 304, each of which is positioned adjacent to a cart on each story of the ascending portion 102a or the descending portion 102b. Each of the vents 304 is configured to output air toward the carts 104 as indicated in arrows in FIG. 8. The airflow generated by the HVAC system 310 may prevent spores and other contaminants from adhering to the plants on the carts 104. In some embodiments, the master controller 106 may receive images of plants on the carts 104 from the imaging device 250 and process the images to determine the type of contaminants on the plants. The master controller 106 may determine a direction and/or airflow power to remove the spores or contaminants based on the identified type of contaminants.

Figure 9:
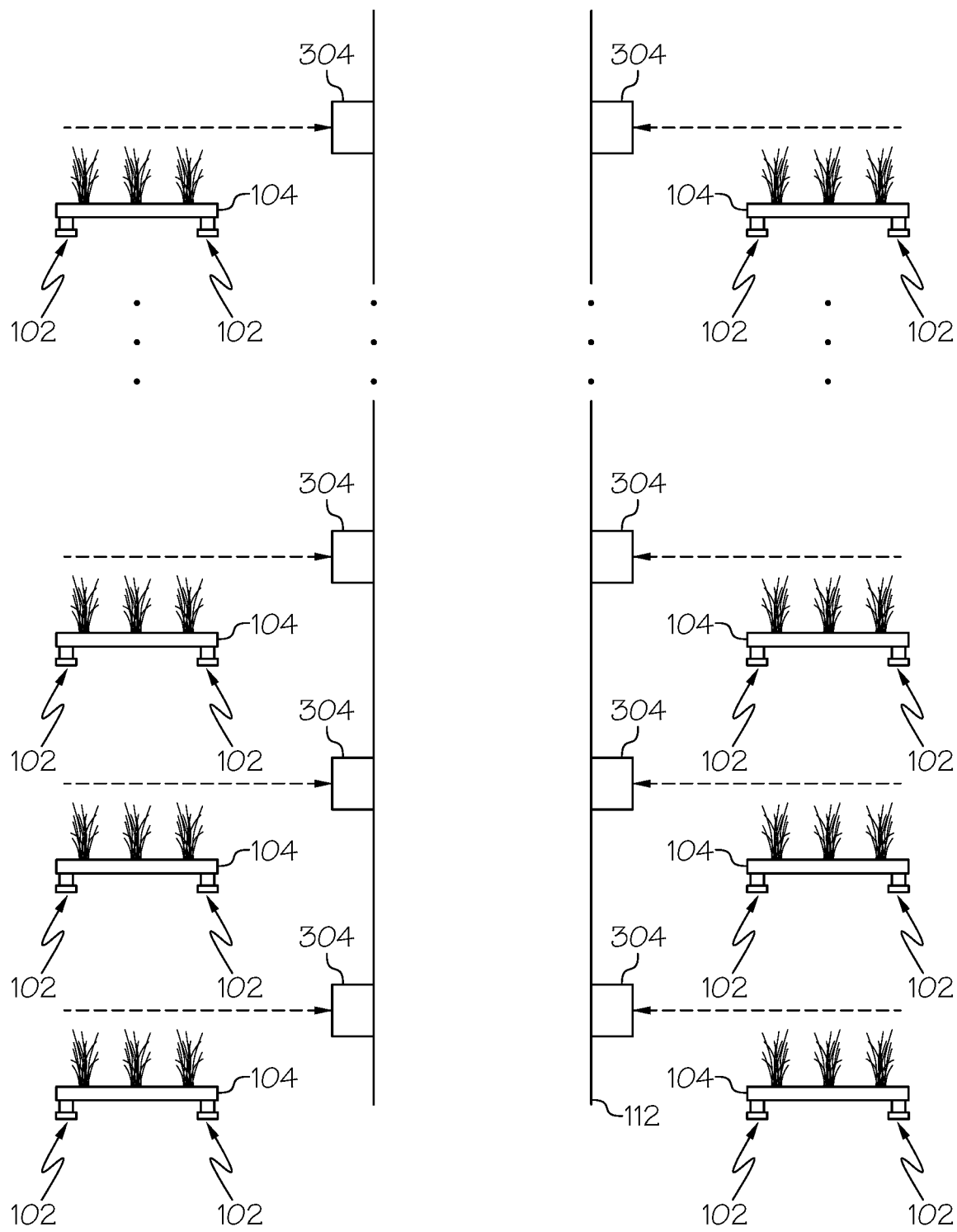
FIG. 9 depicts generating airflow in an assembly line grow pod, according to one or more embodiments shown and described herein.

FIG. 9 depicts a cross-sectional view of the ascending portion 102a or the descending portion 102b in FIG. 1, according to another embodiment shown and described herein. In embodiments, the airflow line 112 extends along the axis of the ascending portion 102a or the descending portion 102b as shown in FIG. 9. The airflow line 112 is connected to the HVAC system 310 (shown in FIG. 4). The airflow line 112 includes a plurality of vents 304, each of which is positioned adjacent to a cart on each story of the ascending portion 102a or the descending portion 102b. Each of the vents 304 is configured to input air such that airflow is created as indicated in broken line arrows in FIG. 9. The airflow generated by the HVAC system 310 may prevent spores and other contaminants from adhering to the plants on the carts 104.

FIG. 10 depicts a master controller 106 for an assembly line grow pod 100, according to embodiments described herein. As illustrated, the master controller 106 includes a processor 630, input/output hardware 632, the network interface hardware 634, a data storage component 636 (which stores systems data 638a, plant data 638b, and/or other data), and the memory component 540. The memory component 540 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the master controller 106 and/or external to the master controller 106.

The memory component 540 may store operating logic 642, the systems logic 544a, and the plant logic 544b. The systems logic 544a and the plant logic 544b may each include a plurality of different pieces of logic, each of which may be embodied as a computer program, firmware, and/or hardware, as an example. A local communications interface 646 is also included in FIG. 10 and may be implemented as a bus or other communication interface to facilitate communication among the components of the master controller 106.

The processor 630 may include any processing component operable to receive and execute instructions (such as from a data storage component 636 and/or the memory component 540). The input/output hardware 632 may include and/or be configured to interface with microphones, speakers, a display, and/or other hardware.

The network interface hardware 634 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the master controller 106 and other computing devices, such as the user computing device 552 and/or remote computing device 554.

The operating logic 642 may include an operating system and/or other software for managing components of the master controller 106. As also discussed above, systems logic 544a and the plant logic 544b may reside in the memory component 540 and may be configured to performer the functionality, as described herein.

It should be understood that while the components in FIG. 10 are illustrated as residing within the master controller 106, this is merely an example. In some embodiments, one or more of the components may reside external to the master controller 106. It should also be understood that, while the master controller 106 is illustrated as a single device, this is also merely an example. In some embodiments, the systems logic 544a and the plant logic 544b may reside on different computing devices. As an example, one or more of the functionalities and/or components described herein may be provided by the user computing device 552 and/or remote computing device 554.

Additionally, while the master controller 106 is illustrated with the systems logic 544a and the plant logic 544b as separate logical components, this is also an example. In some embodiments, a single piece of logic (and/or or several linked modules) may cause the master controller 106 to provide the described functionality.

As illustrated above, various embodiments for providing airflow in a grow pod are disclosed. These embodiments create a quick growing, small footprint, chemical free, low labor solution to growing microgreens and other plants for harvesting. These embodiments may create recipes and/or receive recipes that dictate airflow in the assembly line grow pod that optimizes plant growth and output. The recipe may be implemented strictly and/or modified based on results of a particular plant, tray, or crop.

Accordingly, some embodiments may include an air flow control system for an assembly line grow pod. The air flow control system includes a shell including an enclosed area, one or more carts moving on a track within the enclosed area, an air supplier within the enclosed area, one or more outlet vents coupled to the air supplier, and a controller. The controller identifies a plant on the one or more carts, determines an airflow rate based on an airflow recipe for the identified plant, and controls the air supplier to output air through the one or more outlet vents at the airflow rate. The airflow provided enhances the production and quality of plants as well as prevents spores and other contaminants from adhering to the plants.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. An airflow control system comprising:
a shell including an enclosed area;
one or more carts moving on a track within the enclosed area;
an air supplier within the enclosed area;
one or more outlet vents coupled to the air supplier; and
a controller comprising:
one or more processors;
one or more memory modules; and
machine readable instructions stored in the one or more memory modules that, when executed by the one or more processors, cause the controller to:
identify a plant on the one or more carts;
determine an airflow rate based on an airflow recipe for the identified plant;
control the air supplier to output air through the one or more outlet vents at the airflow rate;
obtain an image of the plant;
identify a type of contaminants deposited directly on the plant based on the obtained image; and
adjust a power of the air output from the air supplier to remove the contaminants from the plant by the air based on the identified type of contaminants deposited directly on the plant.

2. The airflow control system of claim 1, wherein the one or more outlet vents are coupled to the track.

3. The airflow control system of claim 1, further comprising one or more inlet vents, wherein the one or more outlet vents and the one or more inlet vents are positioned within the enclosed area such that at least a portion of the air output through the one or more outlet vents flows into the one or more inlet vents.

4. The airflow control system of claim 1, wherein the track includes an ascending portion wrapping around a first axis perpendicular to ground and a descending portion wrapping around a second axis perpendicular to the ground.

5. The airflow control system of claim 4, further comprising an airflow line extending along the first axis or the second axis, wherein the one or more outlet vents are connected to the airflow line.

6. The airflow control system of claim 1, wherein the one or more outlet vents are configured to change output direction of the air.

7. The airflow control system of claim 6, wherein the machine readable instructions stored in the one or more memory modules, when executed by the one or more processors, cause the controller to determine the output direction of the air based on the identified plant.

8. The airflow control system of claim 1, further comprising one or more airflow sensors within the enclosed area, wherein the machine readable instructions stored in the one or more memory modules, when executed by the one or more processors, cause the controller to adjust the airflow rate based on data received from the one or more airflow sensors.

9. The airflow control system of claim 1, further comprising an imaging device configured to capture an image of the plant, wherein the machine readable instructions stored in the one or more memory modules, when executed by the one or more processors, cause the controller to process the captured image of the plant and identify the plant based on the processed image.

10. The airflow control system of claim 9, wherein the machine readable instructions stored in the one or more memory modules, when executed by the one or more processors, cause the controller to update the airflow recipe for the plant and store the updated airflow recipe in the one or more memory modules based on the captured image of the plant.

11. A method for controlling airflow in an assembly line grow pod, the method comprising:
   sending, by a grow pod computing device, instructions to one or more carts to move along a track within an area enclosed by a shell;
   identifying, by the grow pod computing device, a plant in the one or more carts;
   retrieving, by the grow pod computing device, an airflow recipe for the identified plant from one or more memory modules;
   controlling, by the grow pod computing device, an airflow rate of air exhausted from one or more outlet vents based on the airflow recipe for the identified plant;
   obtaining, by the grow pod computing device, an image of the plant;
   identifying, by the grow pod computing device, a type of contaminants deposited directly on the plant based on the obtained image; and
   adjusting, by the grow pod computing device, a power of the air output from the air supplier to remove the contaminants from the plant by the air based on the identified type of contaminants deposited directly on the plant.

12. The method of claim 11, further comprising changing, by the grow pod computing device, a direction of the air exhausted from the one or more outlet vents based on the identified plant.

13. The method of claim 11, further comprising:
   receiving, by the grow pod computing device, data from one or more airflow sensors; and
   adjusting, by the grow pod computing device, the airflow rate based on data received from the one or more airflow sensors.

14. The method of claim 11, further comprising:
   receiving, by the grow pod computing device, an image of the plant captured by an imaging device; and
   processing the captured image of the plant; and
   identifying the plant based on the processed image.

15. The method of claim 14, further comprising updating, by the grow pod computing device, the airflow recipe based on the captured image of the plant.

16. The airflow control system of claim 1, the machine readable instructions stored in the one or more memory modules, when executed by the one or more processors, cause the controller to:
   monitor a location of the cart carrying the plant including the contaminants; and increase the power of the air output from the vent in response to the cart carrying the plant including the contaminants being proximate to the vent.

* * * * *